US012790963B2

(12) United States Patent
Kesek et al.

(10) Patent No.: US 12,790,963 B2
(45) Date of Patent: Nov. 10, 2026

(54) AIRCRAFT ENGINE WITH LUBRICANT SYSTEM HAVING WINDMILLING CONFIGURATION

(71) Applicant: PRATT & WHITNEY CANADA CORP., Longueuil (CA)

(72) Inventors: Mateusz Kesek, Dębica (PL); Thibaut Edmond J. Duchene, Longueuil (CA); Sebastien Bergeron, Chambly (CA); Roberto Brito, Boucherville (CA); Munir Nathoo, Montreal (CA); Michel Abdelnour, Longueuil (CA); Marcin Rejman, Rzeszow (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/170,581

(22) Filed: Apr. 4, 2025

(65) Prior Publication Data

US 2026/0309051 A1 Oct. 8, 2026

(51) Int. Cl.
*F01D 25/20* (2006.01)
*B64D 27/10* (2006.01)

(52) U.S. Cl.
CPC ............. *F01D 25/20* (2013.01); *B64D 27/10* (2013.01); *F05D 2220/323* (2013.01); *F05D 2260/98* (2013.01); *F05D 2270/091* (2013.01)

(58) Field of Classification Search
CPC ... F01D 25/20; B64D 27/10; F05D 2220/323; F05D 2260/98; F05D 2270/091
See application file for complete search history.

(56) References Cited

U.S. PATENT DOCUMENTS

| | | | | |
|---|---|---|---|---|
| 8,113,317 | B2 | 2/2012 | Delaloye | |
| 8,307,626 | B2 | 11/2012 | Sheridan | |
| 10,107,142 | B2 * | 10/2018 | Mastro | F02C 7/36 |
| 10,590,852 | B2 | 3/2020 | Suciu et al. | |
| 10,590,853 | B2 | 3/2020 | Suciu et al. | |
| 10,711,877 | B2 | 7/2020 | Fisher et al. | |
| 12,291,998 | B2 * | 5/2025 | Gallagher | B64D 27/24 |

(Continued)

FOREIGN PATENT DOCUMENTS

FR 3106155 B1 7/2022

*Primary Examiner* — Andrew J Marien
(74) *Attorney, Agent, or Firm* — NORTON ROSE FULBRIGHT CANADA LLP

(57) ABSTRACT

An aircraft engine, has: a low-pressure assembly having first components having first inlets and first scavenge outlets, one of the first components having a lubricant-receiving volume; a high-pressure spool having second components having second inlets and second scavenge outlets; a lubricant system having: a lubricant tank; a main pump and a scavenge pump driving drive a flow of the lubricant; a secondary pump connectable to the volume and an outlet connectable to the first components; valves; the lubricant system having: a standard configuration in which the valves define a standard flow path extending from the lubricant tank to the first inlets and the second inlets via the main pump; and a windmilling configuration in which the valve define a windmilling flow path extending from the lubricant-receiving volume to the first inlets via the secondary pump while bypassing the main pump, and from the first scavenge outlets to the lubricant-receiving volume.

8 Claims, 12 Drawing Sheets

(56) References Cited

U.S. PATENT DOCUMENTS

| | | | | |
|---|---|---|---|---|
| 2010/0294597 | A1* | 11/2010 | Parnin | F01D 25/18 184/26 |
| 2017/0175874 | A1* | 6/2017 | Schwarz | F16H 57/0479 |
| 2018/0283281 | A1 | 10/2018 | Veilleux, Jr. et al. | |
| 2018/0306062 | A1* | 10/2018 | Avis | F01M 1/02 |
| 2019/0316488 | A1* | 10/2019 | Menczykalski | F01D 25/20 |
| 2019/0316672 | A1* | 10/2019 | Davies | F16H 57/0479 |
| 2024/0280170 | A1 | 8/2024 | Gravina et al. | |
| 2025/0035013 | A1* | 1/2025 | Miller | F01D 25/18 |
| 2025/0043697 | A1 | 2/2025 | Miller et al. | |

* cited by examiner

AIRCRAFT ENGINE WITH LUBRICANT SYSTEM HAVING WINDMILLING CONFIGURATION

TECHNICAL FIELD

The disclosure relates generally to aircraft engines and, more particularly, to systems and methods for lubricating components of those aircraft engines during a windmilling event.

BACKGROUND

Aircraft engines are equipped with air movers, such as propellers, to generate thrust. Windmilling may cause rotation of these air movers even when the aircraft engines are powered off. This may be undesired since some components may no longer be lubricated. Existing methods to lubricate components may be satisfactory, but there remains a need for improvement.

SUMMARY

In one aspect, there is provided an aircraft engine for a multi-engine aircraft, comprising: a low-pressure assembly including a low-pressure turbine drivingly engaged to a rotatable load, the low-pressure assembly having first components engaged by, and configured to assist rotation of, the low-pressure turbine and the rotatable load, the first components being susceptible to rotation by windmilling and having first inlets and first scavenge outlets, one of the first components having a lubricant-receiving volume fluidly connected to scavenge outlets of a remainder of the first components; a high-pressure spool rotating independently of the low-pressure assembly and including a high-pressure turbine drivingly engaging a compressor, the high-pressure spool having second components engaged by, and configured to assist rotation of, the high pressure turbine and the compressor, the second components having second inlets and second scavenge outlets; a lubricant system operatively connected to the first components and the second components, the lubricant system having: a lubricant tank containing a volume of lubricant; a main pump and a scavenge pump operable to drive a flow of the lubricant from the lubricant tank to the first inlets and the second inlets and from the first scavenge outlets and the second scavenge outlets back to the lubricant tank; a secondary pump having an inlet fluidly connectable to the lubricant-receiving volume and an outlet fluidly connectable to the first components; valves selectively fluidly connecting or disconnecting the first inlets of the first components to the main pump and the first scavenge outlets to the scavenge pump; the lubricant system having: a standard configuration in which the valves are configured to define a standard flow path extending from the lubricant tank to the first inlets and the second inlets via the main pump while bypassing the secondary pump, and from the first scavenge outlets and the second scavenge outlets to the lubricant tank via the scavenge pump; and a windmilling configuration in which the valve are configured to define a windmilling flow path extending from the lubricant-receiving volume to the first inlets via the secondary pump while bypassing the main pump, and from the first scavenge outlets to the lubricant-receiving volume while bypassing the scavenge pump.

The aircraft engine described above may include any of the following features, in any combinations.

In some embodiments, the lubricant system is devoid of a secondary scavenge pump between the first scavenge outlets and the secondary pump.

In some embodiments, the secondary pump is located outside the first components.

In some embodiments, the valves include: a first three-way valve fluidly connecting the main pump to the first inlets while disconnecting the secondary pump from the first inlets in the standard configuration, and fluidly connecting the secondary pump to the first inlets while disconnecting the main pump from the first inlets in the windmilling configuration; and a second three-way valve fluidly connecting the first scavenge outlets to the scavenge pump while disconnecting the first scavenge outlets from the secondary pump in the standard configuration, and fluidly connecting the first scavenge outlets to the secondary pump while disconnecting the first scavenge outlets form the scavenge pump in the windmilling configuration.

In some embodiments, the secondary pump is located inside a component of the first components.

In some embodiments, the aircraft engine is a turboprop engine, the rotatable load being a propeller.

In some embodiments, the lubricant-receiving volume is defined by a reduction gearbox interconnecting the propeller to the low-pressure turbine.

In some embodiments, a controller is operatively connected to the valves, the controller having a processing unit and a computer-readable medium having instructions stored thereon executable by the processing unit to: determine that the aircraft engine is powered off and susceptible to windmilling while the multi-engine aircraft is flying; and cause the valves to close the standard flow path and open the windmilling flow path.

In another aspect, there is provided a method of lubricating a subset of components of an aircraft engine of a multi-engine aircraft, the subset of the components being prone to windmilling-induced rotation, comprising: when the aircraft is powered on, supplying lubricant to the components from a lubricant tank with a main pump and scavenging the lubricant from the components back to the lubricant tank with a scavenge pump; and when the aircraft engine is shut down during flight the multi-engine aircraft: supplying the lubricant to the subset of the components from a lubricant-receiving volume defined by a component of the subset of the components with a secondary pump; scavenging the lubricant from the subset of the components back to the lubricant-receiving volume; and preventing the lubricant from flowing through a remainder of the component from the lubricant-receiving volume.

The method described above may include any of the following features, in any combinations.

In some embodiments, the supplying of the lubricant to the subset of the components with the secondary pump includes supplying the lubricant to the subset of the components with the secondary pump being located outside the component of the subset of the components.

In some embodiments, the preventing the lubricant from flowing through the remainder of the components includes preventing the lubricant from reaching the remainder of the components with three-way valves.

In some embodiments, the method comprises: preventing the lubricant pump from communicating with the subset of the components with a first three-way valve; and preventing the lubricant exiting scavenge outlets of the subset of the components from reaching the scavenge pump with a second three-way valve.

In some embodiments, the supplying of the lubricant to the subset of the components with the secondary pump includes supplying the lubricant to the subset of the components with the secondary pump being located inside the component of the subset of the components.

In some embodiments, the preventing the lubricant from flowing through the remainder of the components includes preventing the lubricant from reaching the remainder of the components with valves.

In some embodiments, the method comprises: preventing the lubricant pump from communicating with the subset of the components with a first valve; and preventing the lubricant exiting scavenge outlets of the subset of the components from reaching the scavenge pump with a second valve.

In some embodiments, the method comprises, upon receiving a signal indicative that the aircraft engine is to be shut down and while the aircraft engine is still powered on: increasing a quantity of the lubricant contained in the lubricant-receiving volume of the component.

In some embodiments, the increasing of the quantity of the lubricant includes: preventing the lubricant exiting scavenge outlets of the subset of the components from reaching the scavenge pump; and injecting the lubricant from the main pump into the lubricant-receiving volume.

In some embodiments, the injecting of the lubricant from the main pump into the lubricant-receiving volume includes: injecting the lubricant until an lubricant level in the lubricant-receiving volume reaches a level threshold.

In some embodiments, the injecting of the lubricant from the main pump into the lubricant-receiving volume includes: injecting the lubricant into the lubricant-receiving volume for a given period of time before shutting down the aircraft engine.

In some embodiments, the supplying of the lubricant to the subset of the components and the scavenging of the lubricant from the subset of the components is performed intermittently.

DESCRIPTION OF THE DRAWINGS

Reference is now made to the accompanying figures in which.

DETAILED DESCRIPTION

Figure 1:
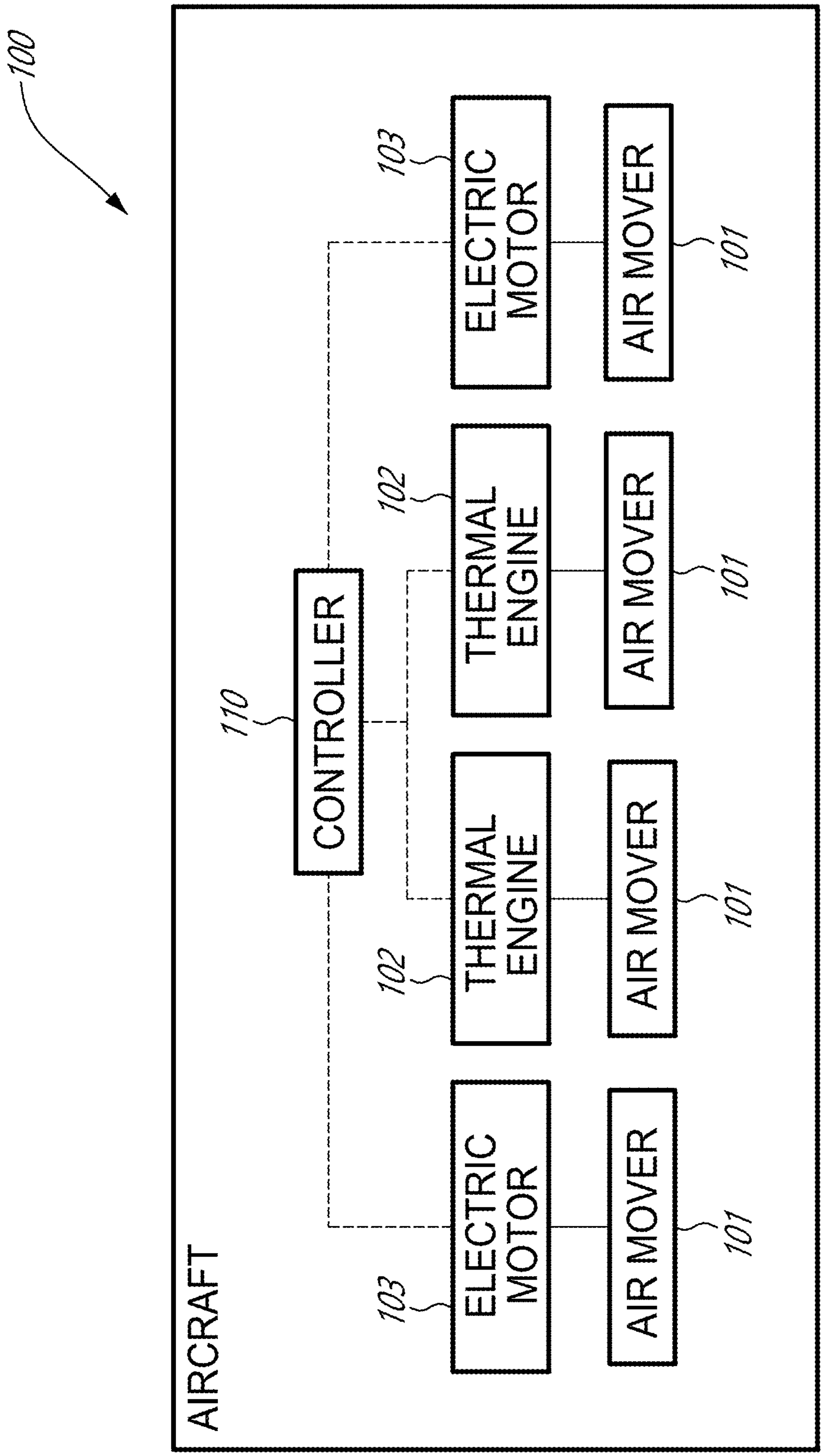
FIG. 1 is a schematic view of a multi-engine aircraft equipped with four engines.

Referring now to FIG. 1, an aircraft is shown at 100. The aircraft 100 is a four-engine aircraft and each of the four engines is drivingly engaged to a respective air mover 101, such as a propeller. The aircraft 100 includes a controller 110 that communicates with each of the four engines for controlling their operation. Of the four engines, two engines are thermal engines 102, such as a gas turbine engine, and the remaining two engines are electric motors 103.

Figure 2:
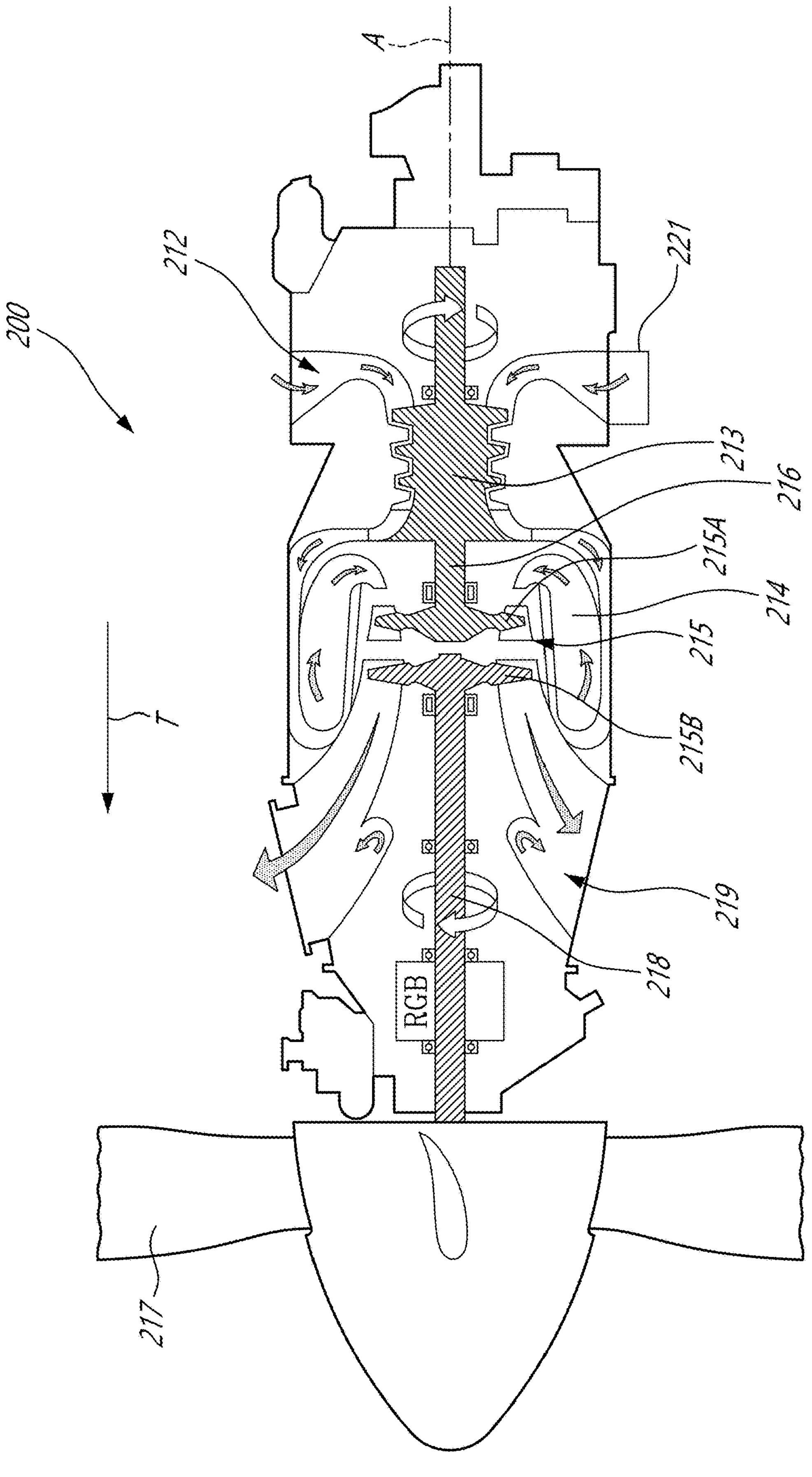
FIG. 2 is a schematic cross-sectional view of an aircraft engine, depicted as a gas turbine engine, for the aircraft of FIG. 1.

FIG. 2 illustrates one of the thermal engines 102 of the aircraft 100. The thermal engine is depicted as a gas turbine engine 200 of a type preferably provided for use in subsonic flight, generally comprising in serial flow communication an inlet 212 for receiving air, a compressor section 213 for compressing the air received via the inlet 212, a combustor 214 for mixing fuel with the compressed air and for generating an annular stream of combustion gases. A turbine 215 receives the combustion gases from the combustor 214. The compressor section 213, the combustor 214, and the turbine 215 are parts of a core of the gas turbine engine 200. The turbine section 215 has a high-pressure turbine 215A drivingly engaged to the compressor section 213 via a high-pressure shaft 216. The turbine 215 further has a power or low-pressure turbine 215B downstream of the high-pressure turbine 215A and drivingly engaged to a propeller 217 via a low-pressure shaft 218. The low-pressure shaft 218 may be directly engaged to the propeller 217 or, as shown herein, drivingly engaged to the propeller 217 via a reduction gearbox RGB. The gas turbine engine 200 has an exhaust 219 for expelling the combustion gases. The high-pressure turbine 215A and the compressor section 213 form a high-pressure spool whereas the low-pressure turbine 215B and the propeller 217, or other rotatable load, form a low-pressure assembly.

In an alternate embodiment, the compressor section 213 may include a high-pressure compressor drivingly engaged to the high-pressure turbine 215A via the high-pressure shaft 216 and a low-pressure compressor drivingly engaged to the low-pressure turbine 215B via the low-pressure shaft 218. The gas turbine engine 200 of FIG. 2 is a reverse flow engine in that a flow direction through the core is the same as a direction of travel T of the gas turbine engine 200. The principles of the present disclosure are also applicable to through-flow gas turbine engine in which the flow direction through the core is opposite the direction of travel T. Principles of the present disclosure apply to any aircraft propulsor including a heat engine (e.g., turboprop, turboshaft, reciprocating engine, rotary engine, etc.).

In some embodiments, the low-pressure turbine 215B, also referred to as the pressure turbine, is mechanically disconnected from the high-pressure turbine 215A. This may be referred to as a "free-turbine" configuration. Typically, the high-pressure turbine 215A drives a lubricant pump responsible for driving a lubricant flow to the different components in need of lubricant. These components include, for instance, bearings, gears of the reduction gear box, and so on. These components are thus engaged by, and configured to assist rotation of, the turbines and compressor of the gas turbine engine 200. If the gas turbine engine 200 is powered off, the lubricant pump is no longer driven by the high-pressure shaft 216, which is substantially non-rotating. However, the propeller 217, even with the blades in a feathering position, may be subjected to windmilling. This may be undesired as components, such as the bearings of the low-pressure shaft 18 and gears of the reduction gearbox RGB, may be rotating without being lubricated.

Referring back to FIG. 1, this situation may arise when the aircraft 100 is operated using solely the two electric motors 103, for instance, during cruise. The thermal engines 102 may be powered for phases requiring more thrust, such as take-off and climb. However, powering off the thermal engines 102 may cause the propeller 217 to windmill, that is, to rotate due to air flowing around blades of the propeller 217. To at least partially alleviate this phenomenon, propeller blades may be rotated in a feather position to minimize drag and, thus, to minimize windmilling. However, some windmilling may remain. If the propeller 217 rotates while the gas turbine engine 200 is powered off, the different components of the gas turbine engine 200, such as the reduction gearbox RGB, bearings of the low-pressure shaft 218, and so on, may not be lubricated since pumps of the lubricant system are not powered. The windmilling may cause these components to rotate without lubrication. This may be undesirable.

Figure 3A:
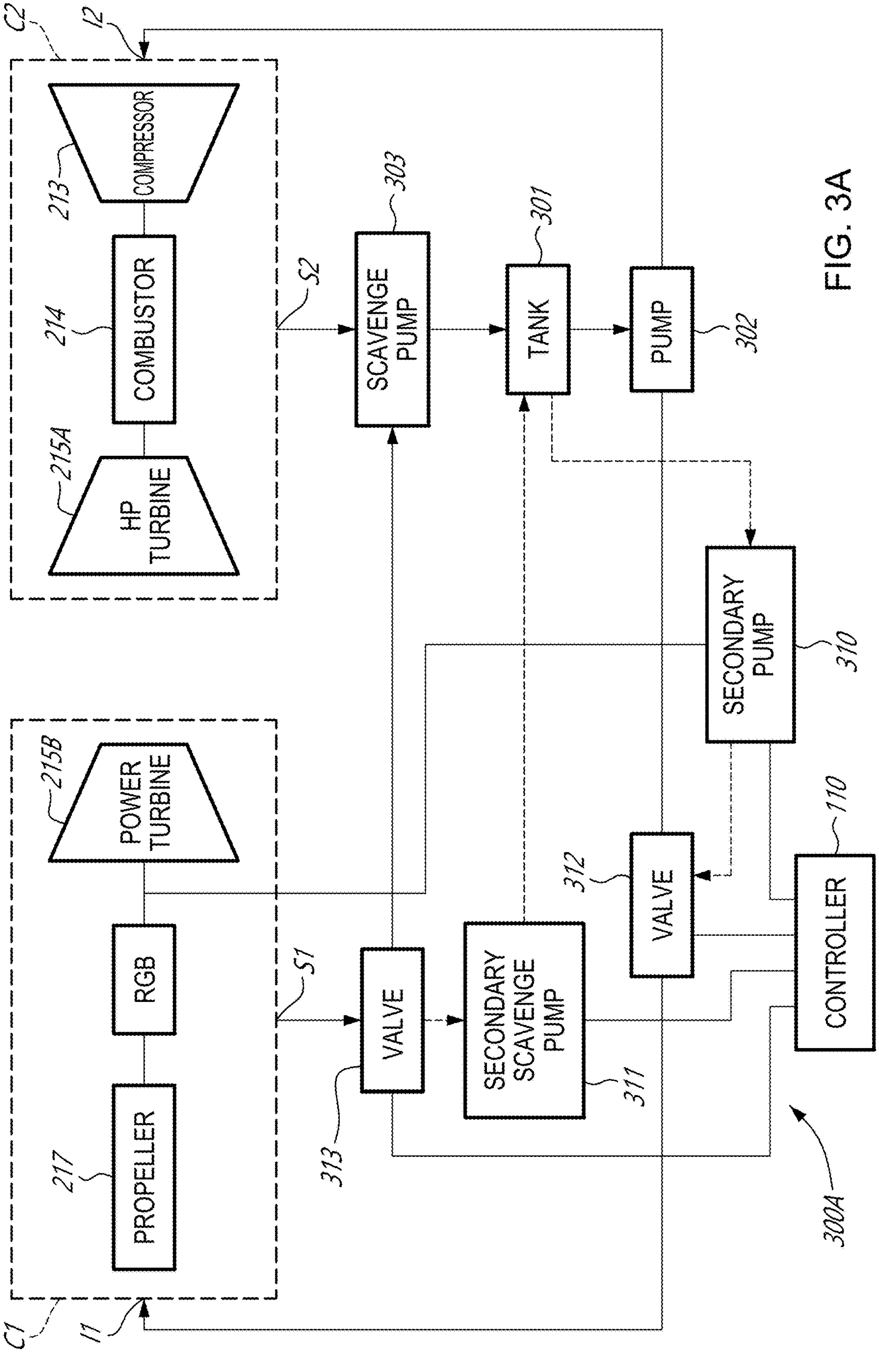
FIGS. 3A-3C are schematic views of some embodiments of a lubricant system for the aircraft engine of FIG. 2.

Referring to FIG. 3A, a lubricant system that may at least partially alleviate these drawbacks is shown at 300A. The lubricant system 300A may be used with the gas turbine engine 200 of FIG. 2. It will be appreciated that some components (e.g., filters, pressure regulating valves, heat exchangers, etc.) receiving lubricant are omitted for clarity. The components may be divided between first components C1 and second components C2. The first components C1 are drivingly engaged by the low-pressure turbine 215B and, thus, may be subjected to windmilling-induced rotation while the gas turbine engine 200 is powered off while the aircraft 100 (FIG. 1) is flying. The first components C1 include bearings of the low-pressure shaft 218, gears of the RGB, and other rotating components of the low-pressure turbine 215B for instance. The second components C2 are drivingly engaged by the high-pressure turbine 215A and may be substantially non-rotating while the gas turbine engine 200 is powered off. Herein, "non-rotating" implies that some rotation is possible, but not sufficient to require lubrication of the components. The second components C2 may be referred to as components of a core of the gas turbine engine 200.

The lubricant system 300A includes a lubricant tank 301 containing a volume of lubricant, such as oil. A main pump 302 has an inlet fluidly connected to the lubricant tank 301 and an outlet fluidly connected to both of the first components C1 and the second components C2 that are in need of lubrication. The main pump 302 induces a lubricant flow from the lubricant tank 301 to first inlets I1 of the first components C1 and second inlets I2 of the second components C2. A scavenge pump 303 has an inlet fluidly connected to first scavenge outlets S1 and second scavenge outlets S2 of the first components C1 and the second components C2 and an outlet fluidly connected to the lubricant tank 301.

It will be appreciated that the lubricant system 300A includes other components that are not illustrated for clarity. These other components include, for instance, lubricant filters, sensor(s), heat exchanger(s), such as an lubricant cooler and fuel heater, valves, de-aerator, and so on.

The lubricant system 300A further includes a secondary pump 310 and a secondary scavenge pump 311 that are operable to drive a lubricant flow solely to the first components C1 while bypassing the second components C2 during a windmilling event. More specifically, the secondary pump 310 has an inlet fluidly connectable to a lubricant source, which herein corresponds to the lubricant tank 301, and an outlet fluidly connectable to the first components C1. The secondary scavenge pump 311 has an inlet fluidly connectable to the first scavenge outlets S1 of the first components C1 and an outlet fluidly connectable to the lubricant source, herein corresponding to the lubricant tank 301.

The lubricant system 300A includes valves for selectively fluidly connecting or disconnecting the first inlets S1 of the first components C1 to the main pump 302 or to the secondary pump 310 and the first scavenge outlets S1 to the scavenge pump 303 or to the lubricant tank 301. The valves include a first valve 312 and a second valve 313. The first valve 312 may be a first three-way valve 312 having a first primary inlet fluidly connected to the main pump 302 and a first secondary inlet fluidly connected to the secondary pump 310, and a first outlet fluidly connected to the first inlets I1 of the first components C1. The second valve 313 may be a second three-way valve having a second inlet fluidly connected to the first scavenge outlets S1 of the first components C1, a second primary outlet fluidly connected to the scavenge pump 303, and a second secondary outlet fluidly connected to the secondary scavenge pump 311.

The lubricant system 300A is therefore operable in two distinct configurations-a standard configuration and a windmilling configuration-depending of whether or not the gas turbine engine 200 is powered on or powered off. In the standard configuration, the valves 312, 313 are configured to define a standard flow path extending from the lubricant tank 301 to the first inlets I1 and the second inlets I2 via the main pump 302 while bypassing the secondary pump 310 and from the first scavenge outlets S1 and the second scavenge outlets S2 to the lubricant tank 301 via the scavenge pump 303, herein while bypassing the secondary scavenge pump 311. In the windmilling configuration, the valves 312, 313 are configured to define a windmilling flow path extending from the lubricant tank 301 to the first inlets I1 via the secondary pump 310 while bypassing the main pump 302 and from the first scavenge outlets S1 to the lubricant tank 301 via the secondary scavenge pump 311 while bypassing the scavenge pump 303.

In the drawings, the standard flow path is shown with solid connection lines whereas the windmilling flow path is shown with dashed connection lines.

Thus, in the standard configuration, the first valve 312 fluidly connects the main pump 302 to the first inlets I1 while disconnecting the secondary pump 310 from the first inlets I1, and the second valve 313 fluidly connects the first scavenge outlets S1 of the first components C1 to the scavenge pump 303 while disconnecting the first scavenge outlets S1 from the secondary scavenge pump 311. In the windmilling configuration, the first valve 312 disconnects the main pump 302 from the first inlets I1 while fluidly connecting the secondary pump 310 to the first inlets I1, and the second valve 313 disconnects the first scavenge outlets S1 of the first components C1 from the scavenge pump 303 while fluidly connecting the first scavenge outlets S1 to the secondary scavenge pump 311.

In the standard configuration, the main pump 302 draws a flow of lubricant from the lubricant tank 301 and feeds this flow of lubricant to the first components C1 and the second components C2 of the gas turbine engine 200. The scavenge pump 303 then receives lubricant exiting the first scavenge outlets S1 and the second scavenge outlets S2 and feeds this lubricant to the lubricant tank 301 and the cycle continues. The main pump 302 may be driven by a shaft of the gas turbine engine 200, such as via an accessory gear box. When the gas turbine engine 200 is powered off, the main pump 302 is no longer driven since the core of the gas turbine engine 200 is substantially non-rotating. Herein, the expression "substantially" implies that some rotation is possible due for windmilling, but such rotation may be insufficient in driving the main pump 302.

When the gas turbine engine 200 is powered off and when the multi-engine aircraft 100 (FIG. 1) is flying, the lubricant system 300A is operated in the windmilling configuration in which the valves 312, 313 are configured to connect the first components C1 and the first scavenge outlets S1 to the secondary pump 310 and secondary scavenge pump 311 while preventing the secondary pump 310 from inputting lubricant into the second components C2 of the gas turbine engine 200, that is, the components of the core that is substantially non-rotating. The valves 312, 313 also prevent the secondary scavenge pump 311 from drawing lubricant out of the first components C1 in the standard configuration. The secondary scavenge pump is powered off in the standard configuration. In the windmilling configuration, the secondary pump 310 and secondary scavenge pump 311 create a flow of lubricant to and from the first components C1 that are susceptible to windmilling. The secondary pump 310 and secondary scavenge pump 311 may be driven by electric motor(s) or an suitable actuator. These pumps may alternatively be driven by the low-pressure shaft of the gas turbine engine 200 that rotates because of the windmilling. Hence, the system may be self adjusted since the faster the subcomponents rotate, the more lubricant they need, and the faster these pumps will turn via windmilling.

The controller 110 may be operatively connected to the first valve 312, the second valve 313, the secondary pump 310, and the secondary scavenge pump 311. The controller 110 is configured to determine that the gas turbine engine 200 is powered off and susceptible to windmilling while the multi-engine aircraft 100 is flying; and cause the valves 312, 313 to close the standard flow path and open the windmilling flow path. The controller 110 may cause the secondary pump 310 and the secondary scavenge pump 311 to drive a flow of the lubricant by continuously or intermittently powering one or more electric motor(s) drivingly engaged to said pumps.

Figure 3B:
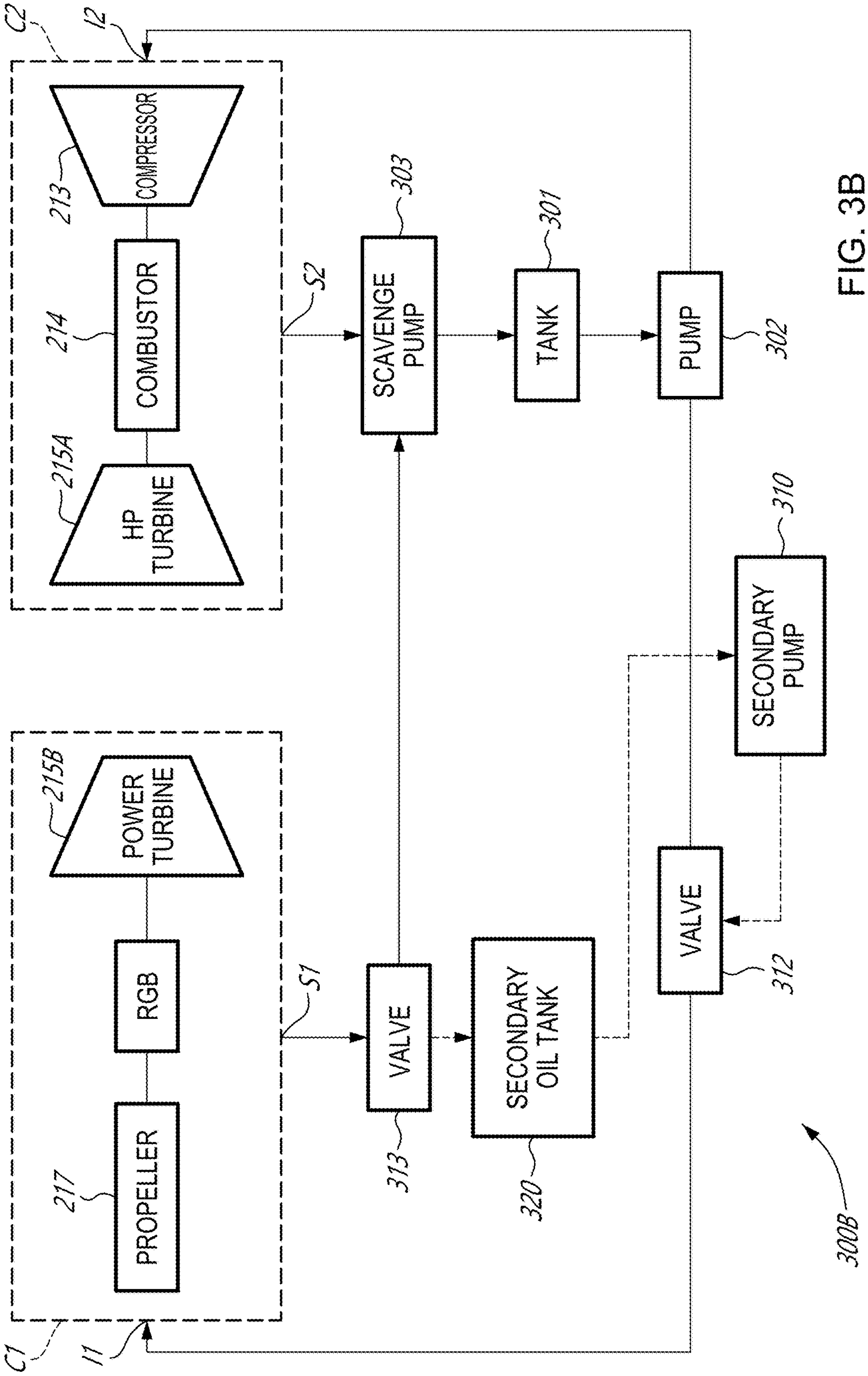

Referring to FIG. 3B, a variant of the lubricant system of FIG. 3A is shown at 300B. For the sake of conciseness, only features differing from the lubricant system 300A of FIG. 3A are described below.

In the embodiment shown, the lubricant system 300B includes a secondary lubricant tank 320, which corresponds to the lubricant source. The secondary lubricant tank 320 has an outlet fluidly connected to the secondary pump 310. The windmilling flow path extends through the secondary lubricant tank 320. The secondary lubricant tank 320 is located downstream of the first scavenge outlets S1 of the first components C1 and upstream of the secondary pump 310. Thus, in this configuration, the lubricant system 300B is devoid of a scavenge pump between the first scavenge outlets S1 and the secondary lubricant tank 320. Put differently, the outlet of the second valve 313 is directly fluidly connected to the secondary lubricant tank 320. In the windmilling configuration of the lubricant system 300B, the windmilling flow path completely bypasses the lubricant tank 301. In this configuration, the lubricant exiting the first scavenge outlets S1 may reach the secondary lubricant tank 320 by being pulled by the secondary pump creating a flow from the secondary oil tank and thus from the first scavenge outlets S1.

Figure 3C:
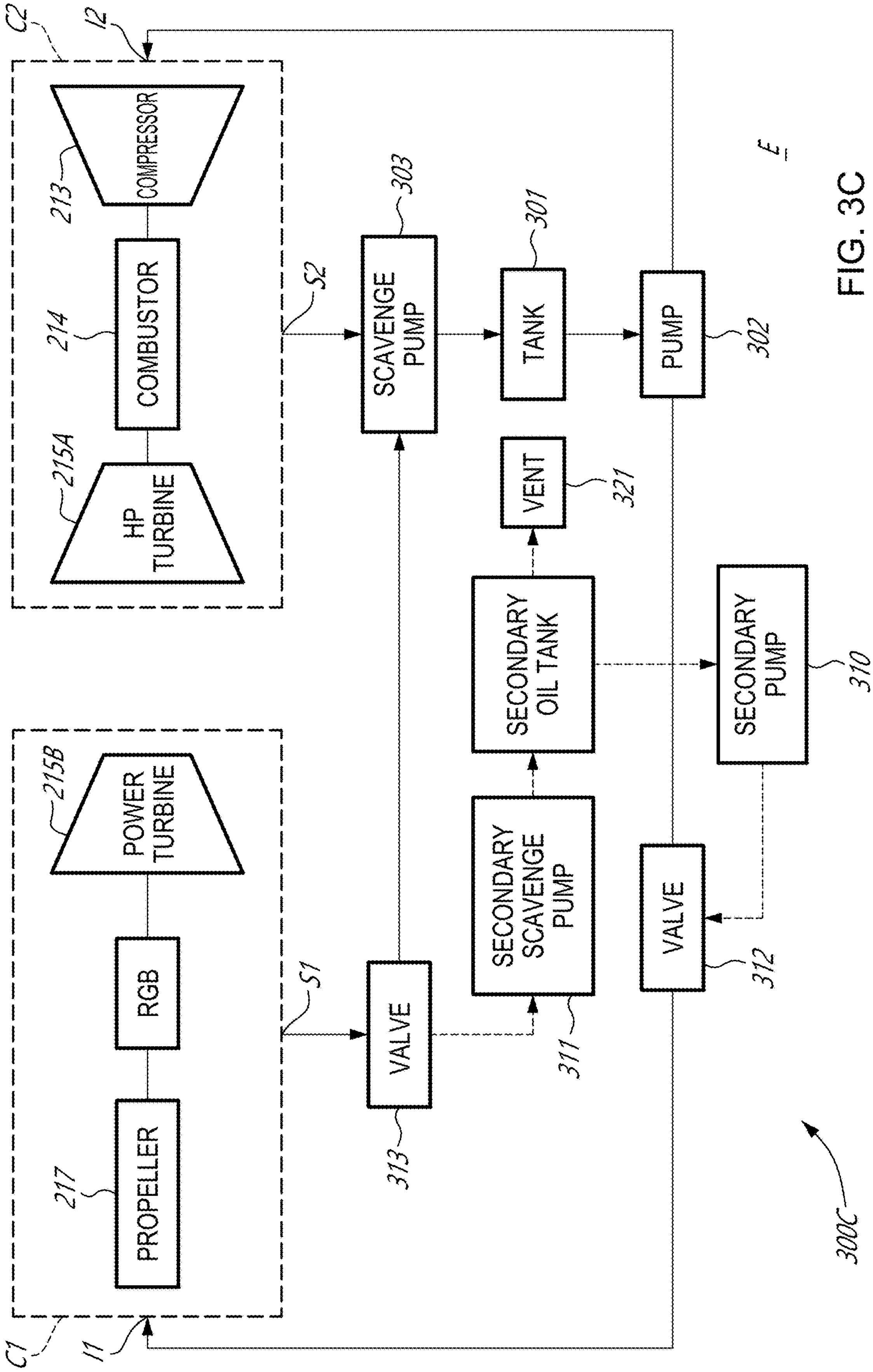

Referring to FIG. 3C, a variant of the lubricant system 300B of FIG. 3B is shown at 300C. For the sake of conciseness, only features differing from the lubricant system 300B of FIG. 3B are described below.

In the embodiment shown, the lubricant system 300C further includes the secondary scavenge pump 311 fluidly connecting the first scavenge outlets S1 of the first components C1 to the secondary lubricant tank 320 in the windmilling configuration. The windmilling flow path extends from the first scavenge outlets S1 to the secondary lubricant tank 320 via the secondary scavenge pump 311. The secondary lubricant tank 320 may include a vent 321 fluidly connected to an environment E outside the gas turbine engine 200. The vent 321 permits air that mixes with the lubricant from escaping while the lubricant sits in the secondary lubricant tank 320.

Figure 3D:
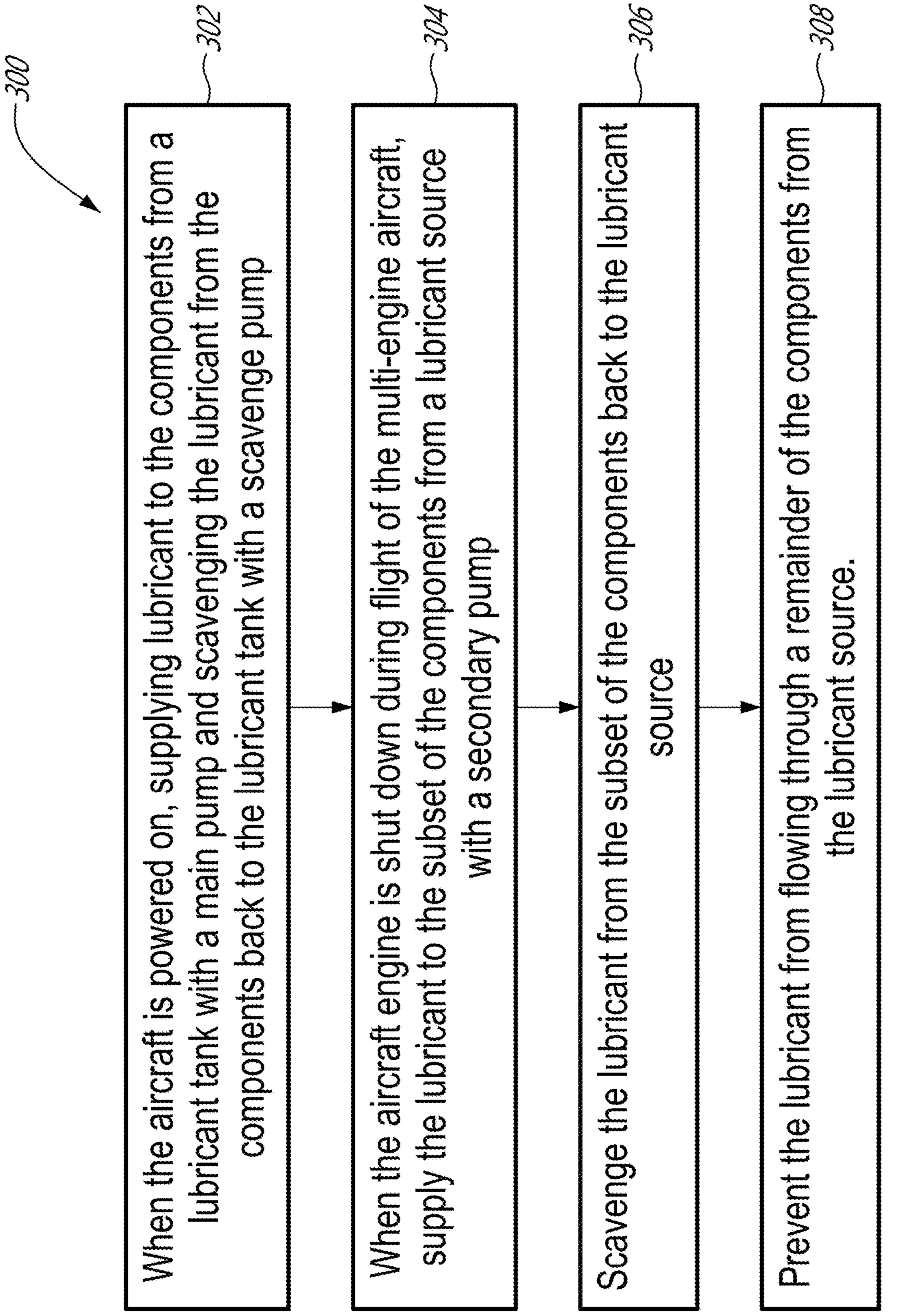
FIG. 3D is a flowchart illustrating steps of a method of lubricating components susceptible to windmilling-induced rotation.

Referring now to FIG. 3D, a method of lubricating a subset of the components being prone to windmilling-induced rotation is shown at 300. The subset corresponds to the first components C1.

The method 300 includes when the aircraft is powered on, supplying lubricant to the components from the lubricant tank 301 with the main pump 302 and scavenging the lubricant from the components back to the lubricant tank with the scavenge pump 303 at 302; and when the aircraft engine is shut down during flight of the multi-engine aircraft: supplying the lubricant to the subset of the components, namely the first components C1, from the lubricant source with the secondary pump 310 at 304; scavenging the lubricant from the subset of the components back to the lubricant source at 306; and preventing the lubricant from flowing through a remainder of the components, namely the second components C2, from the lubricant source at 308.

In some embodiments, such as illustrated in FIGS. 3A and 3C, the scavenging of the lubricant includes scavenging the lubricant to the lubricant source with the secondary scavenge pump 311. Alternatively, as shown in FIG. 3B, the scavenging of the lubricant may include scavenging the lubricant to the lubricant source with the secondary pump 310 without requiring an additional scavenge pump.

The scavenging of the lubricant from the subset of the components of the components back to the lubricant source may include scavenging the lubricant to the secondary lubricant tank 320 as shown in FIGS. 3B and 3C. This may include venting the secondary lubricant tank as shown in FIG. 3C.

The preventing of the lubricant from flowing through the remainder of the components may include preventing the lubricant from reaching the remainder of the components with three-way valves. The method 300 may include preventing the main pump 302 from communicating with the subset of the components with a first three-way valve; and preventing the lubricant exiting scavenge outlets of the subset of the components from reaching the scavenge pump with a second three-way valve.

The supplying of the lubricant to the subset of the components with the secondary pump 310 may include electrically driving the secondary pump 310.

The supplying of the lubricant to the subset of the components with the secondary pump 310 may include drivingly engaging the secondary pump with a shaft, such as the low-pressure shaft, of the aircraft engine, the shaft rotating during the windmilling. This configuration is shown in FIG. 3A.

Figure 4A:
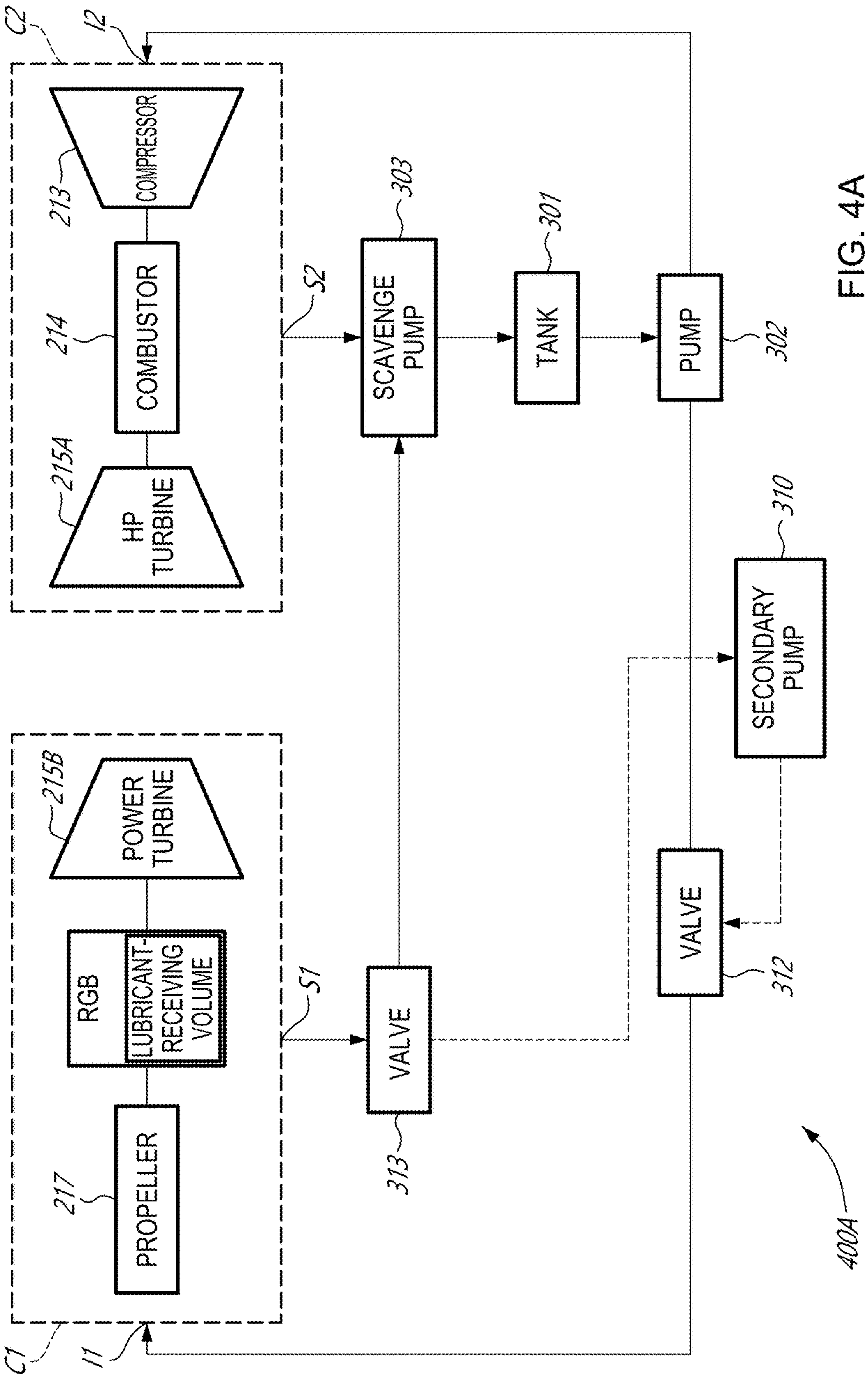
FIGS. 4A-4B are schematic views of additional embodiments of a lubricant system for the aircraft engine of FIG. 2.

Referring now to FIG. 4A, a variant of the lubricant systems of FIG. 3A-3C is shown at 400A. For the sake of conciseness, only features differing from the lubricant systems described above are described below.

In the embodiment shown, one of the first components C1 defines a volume, referred to as a lubricant-receiving volume V1, for receiving lubricant. In this configuration, the reduction gearbox RGB defines the lubricant-receiving volume. The valves, namely the first valve 312 and the second valve 313, may be three-way valves to selectively fluidly connect or disconnect the first inlets I1 of the first components C1 to the main pump 302 or to the secondary pump 310 and the first scavenge outlets S1 to the scavenge pump 303 or to the lubricant-receiving volume V1.

Here again, the lubricant system 400A has a standard configuration in which the valves are configured to define a standard flow path extending from the lubricant tank 301 to the first inlets I1 and the second inlets I2 via the main pump 302 while bypassing the secondary pump 310 and from the first scavenge outlets S1 and the second scavenge outlets S2 to the lubricant tank 301 via the scavenge pump 303, and a windmilling configuration in which the valve are configured to define a windmilling flow path extending from the lubricant-receiving volume V1 to the first inlets I1 via the secondary pump 310 while bypassing the main pump 302 and from the first scavenge outlets S1 to the lubricant-receiving volume V1 while bypassing the scavenge pump 303.

In this configuration, the lubricant system 400A is devoid of a secondary scavenge pump between the first scavenge outlets S1 and the secondary pump 310. The secondary pump 310 is located outside of the component that defines the lubricant-receiving volume V1.

In the embodiment shown, the first valve 312 is a first three-way valve fluidly connecting the main pump 302 to the first inlets I1 while disconnecting the secondary pump 310 from the first inlets I1 in the standard configuration, and fluidly connecting the secondary pump 310 to the first inlets I1 while disconnecting the main pump 302 from the first inlets I1 in the windmilling configuration. The second valve 313 is a second three-way valve fluidly connecting the first scavenge outlets S1 to the scavenge pump 303 while disconnecting the first scavenge outlets S1 from the secondary pump 310 in the standard configuration, and fluidly connecting the first scavenge outlets S1 to the secondary pump 310 while disconnecting the first scavenge outlets S1 form the scavenge pump 303 in the windmilling configuration.

Figure 4B:
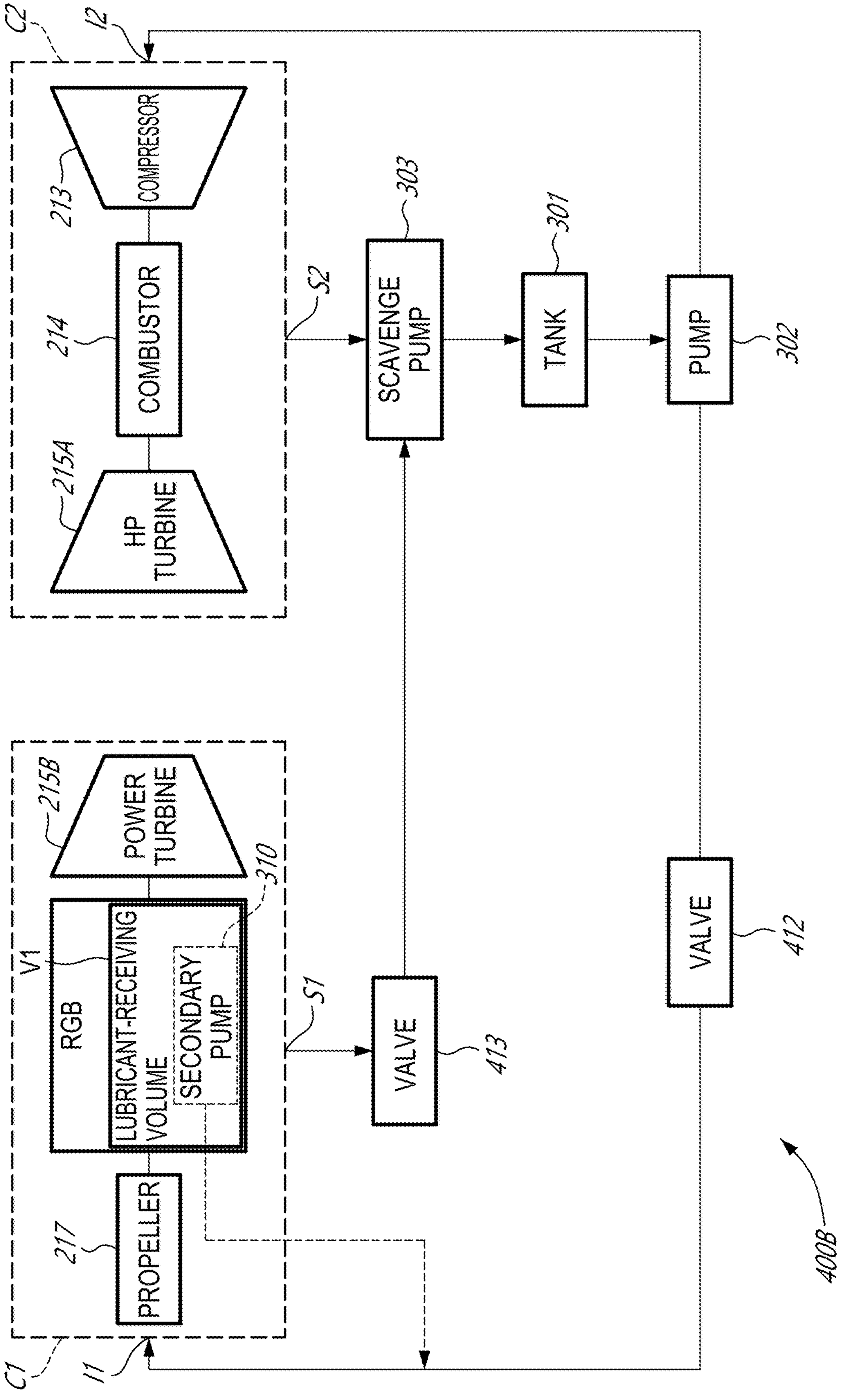

Referring now to FIG. 4B, another embodiment of a lubricant system is shown at 400B. For the sake of conciseness, only features differing from the system of FIG. 4A are described below.

In the embodiment shown, the secondary pump 310 is located inside the component (e.g., RGB) and, more specifically, inside the lubricant-receiving volume V1 of the component. In this case, the lubricant system 400B includes a first two-way valve 412 and a second two-way valve 413. The first two-way valve 412 is located between the main pump 302 and the first inlets I1 and is operable to allow or block fluid communication between the main pump 302 and the first inlets I1. The second two-way valve 413 is located between the first scavenge outlets S1 and the scavenge pump 303 and is operable to allow or block fluid communication between the first scavenge outlets S1 and the scavenge pump 303. An additional outlet may be defined through the RGB to connect an outlet of the secondary pump 310 to the first inlets I1. This additional outlet may be distinct from a scavenge outlet of the RGB. An additional valve (not shown) may then be located at the scavenge outlet of the RGB to selectively allow oil to be scavenged out of the RGB to the scavenge pump.

Using the RGB as the windmilling oil tank may involve having it partially filled during shutdown and adding a pressure pump (i.e., the secondary pump 310) to circulate the remaining oil in the RGB. The valves may be actuated by either electrical signals or engine pressure sources such as oil, fuel, or air. These valves may be modulated by the controller 110 to vary the closure/opening schedule. The RGB may maintain a sufficient amount of oil by controlling valves on the main pump 302 and scavenge lines to intentionally increase the oil level during engine shutdown. Typically, the scavenge lines would be closed to stop oil removal from the RGB during shutdown. An additional valve or relief might be required at an inlet of the scavenge pump 303 to avoid cavitation during this period. The controller 110 may determine the closing schedule of these valves based on oil temperature, engine speed, engine slowdown profiles, ambient conditions at the moment of engine shutdown, or other inputs from the aircraft, such as mission planning. During standard or normal operation, the pressure of the main pump 302 and scavenge pump 303 supply and scavenge oil from the RGB as usual. In windmilling, there is no pressure and suction from the main pump 302 since it is not rotating. The secondary pump 310 is started and pushes the lubricant to the RGB, pulling from the scavenge lines as well. In some embodiments, operation of the secondary pump 310 may be intermittent. For instance, the secondary pump 310 may be operated for a few minutes for every given period of time (e.g., operated during 1 minute for every 10 minutes) such that the bearings and other components are suitably lubricated. The valves may prohibit lubricant from flowing through the components that do not need lubrication when the gas turbine engine 200 is shut down. In some cases, no cooler is required. If cooling is required, it could be achieved by having some heat rejection to the environment E by adding fins or placing some lubricant lines in a wind-exposed location, or by connecting it to a heat exchanger shared with the electric/hybrid components. The secondary pump 310 (or other pumps such as the secondary scavenge pump) may be powered by an external source, either mechanical, electrical, or hydraulic, when the engine is in windmilling. These pumps could also be driven by the RGB section through a set of gears and potentially a clutch or any means to engage/disengage them. The valve block and pump area might also be used as limited oil storage capacity, increasing the total oil in the RGB used for windmilling recirculation. A heater may be required and may be either an electric heater submerged in the RGB or any other heater type that transfers heat to the oil lines. In the configuration of FIG. 4B, the secondary pump 310 and potential valves to ensure oil goes to the proper oil channel may be fully submerged in the RGB. This may allow for the use of two-way valves instead of three-way valves, simplifying the control system.

Figure 4C:
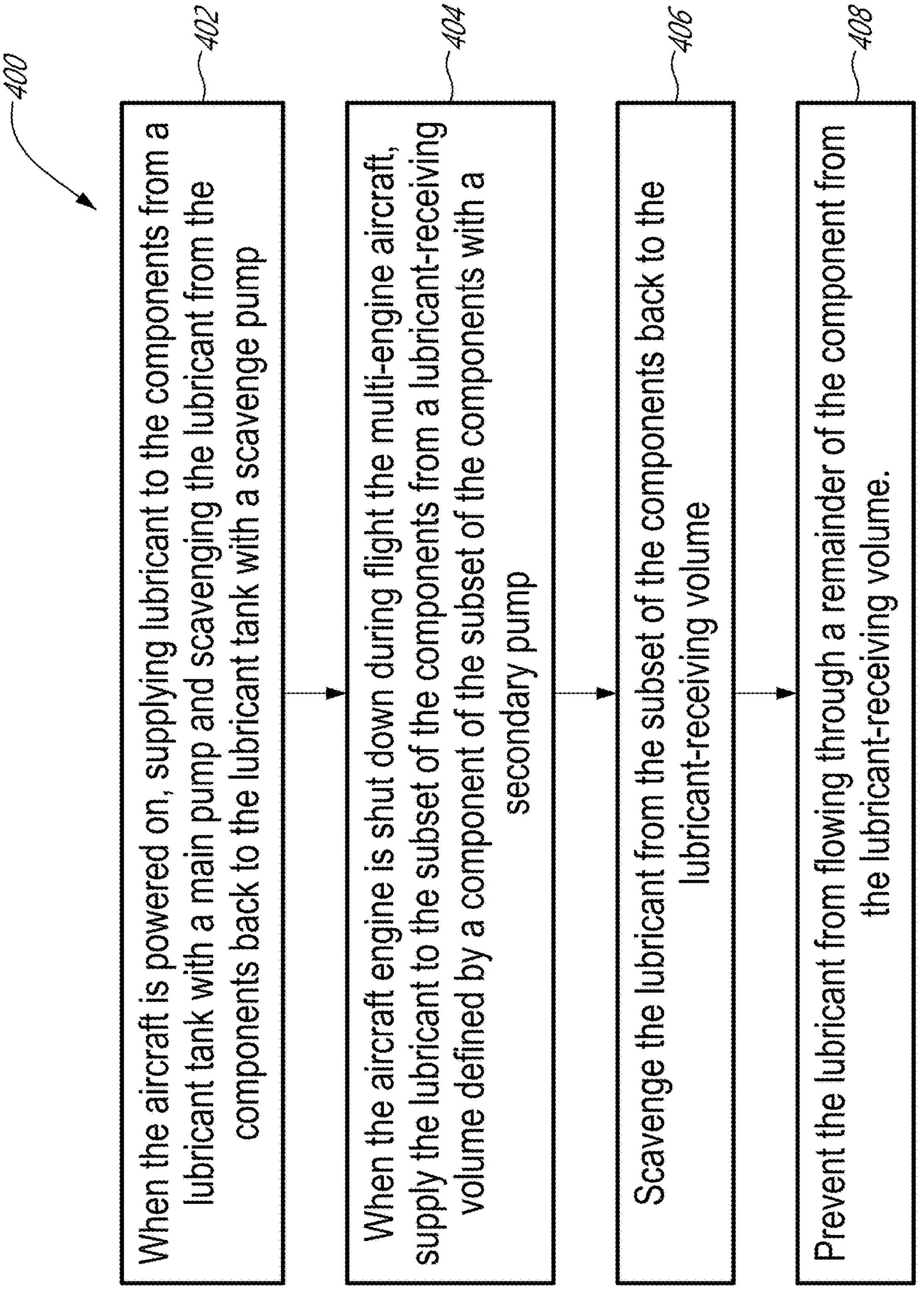
FIG. 4C is a flowchart illustrating steps of a method of lubricating components susceptible to windmilling-induced rotation.

Referring now to FIG. 4C, a method of lubricating a subset of components of an aircraft engine of a multi-engine aircraft is shown at 400.

The method 400 includes when the aircraft is powered on, supplying lubricant to the components from the lubricant tank 301 with the main pump 302 and scavenging the lubricant from the components back to the lubricant tank 301 with the scavenge pump 303 at 404; and when the aircraft engine is shut down during flight the multi-engine aircraft: supplying the lubricant to the subset of the components from the lubricant-receiving volume V1 defined by a component of the subset of the components with the secondary pump 310 at 406; scavenging the lubricant from the subset of the components back to the lubricant-receiving volume V1 at 406; and preventing the lubricant from flowing through a remainder of the component from the lubricant-receiving volume V1 at 408.

The supplying of the lubricant to the subset of the components with the secondary pump 310 may include supplying the lubricant to the subset of the components with the secondary pump 310 being located outside the component of the subset of the components as shown in FIG. 4A.

Alternatively, as shown in FIG. 4B, the supplying of the lubricant to the subset of the components with the secondary pump 310 includes supplying the lubricant to the subset of the components with the secondary pump 310 being located inside the component of the subset of the components. This component may be the RGB.

The preventing the lubricant from flowing through the remainder of the components includes preventing the lubricant from reaching the remainder of the components with three-way valves. Namely, this may include preventing the lubricant pump from communicating with the subset of the components with a first three-way valve; and preventing the lubricant exiting scavenge outlets of the subset of the components from reaching the scavenge pump with a second three-way valve.

As shown in FIG. 4B, when the secondary pump 310 is located inside the component, the valves used are two-way valve instead of three-way valves as depicted in FIG. 4A. The method 400 may include preventing the main pump 302 from communicating with the subset of the components with the first valve; and preventing the lubricant exiting scavenge outlets of the subset of the components from reaching the scavenge pump with the second valve.

Also, to ensure that sufficient lubricant is contained in the lubricant-receiving volume V1, the method 400 may include upon receiving a signal indicative that the aircraft engine is to be shut down and while the aircraft engine is still powered on: increasing a quantity of the lubricant contained in the lubricant-receiving volume V1 of the component. This may include preventing the lubricant exiting the first scavenge outlets S1 from reaching the scavenge pump 303; and injecting the lubricant from the main pump 302 into the lubricant-receiving volume V1. The method 400 may further include injecting the lubricant until a lubricant level in the lubricant-receiving volume V1 reaches a level threshold. The injecting of the lubricant from the main pump 302 into the lubricant-receiving volume V1 may include: injecting the lubricant into the lubricant-receiving volume V1 for a given period of time before shutting down the aircraft engine.

The supplying of the lubricant to the subset of the components and the scavenging of the lubricant from the subset of the components may be performed intermittently.

Figure 5A:
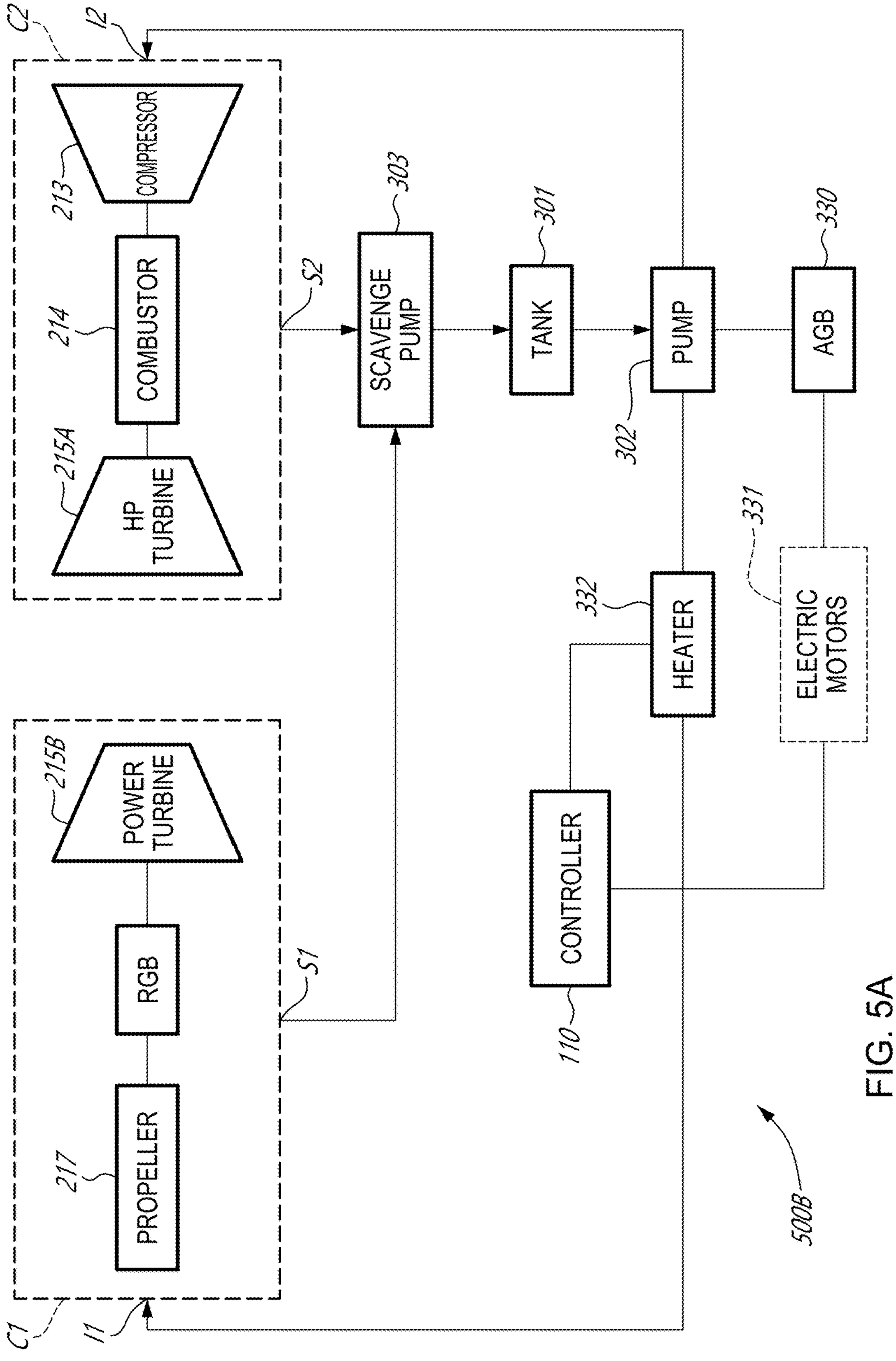
FIG. 5A is a schematic view of a further embodiment of a lubricant system for the aircraft engine of FIG. 2.

Referring now to FIG. 5A, a lubricant system in accordance with yet another embodiment is shown at 500B.

In this embodiment, the lubricant system 500B includes the main pump 302 that drives a lubricant flow from the lubricant tank 301 to the first components C1 and the second components C2 and lubricant is scavenged from the components C1, C2 via the scavenge pump 303 as described below. As illustrated, in standard operation, that is, when the gas turbine engine 200 is powered on, the high pressure shaft of the gas turbine engine 200 drivingly engages the main pump 302 via an accessory gearbox 330. During a windmilling event (i.e, when the gas turbine engine 200 is powered off during flight), an electric motor 331 is used to drive the main pump 302, herein via the accessory gearbox 330.

Thus, in the standard configuration, the electric motor 331 is powered off and the main pump 302 is driven by the high-pressure shaft of the gas turbine engine 200. In the windmilling configuration, the pump may be driven through the AGB, or directly, with the electric motor. This may indirectly cause the high pressure shaft to rotate. This engagement may be done directly, or via the accessory gearbox 330 as depicted. The electric motor 331 may be engaged to the main pump 302 via a one-way clutch (e.g., sprag clutch), such that the high-pressure shaft of the gas turbine engine 200 is disengaged from the electric motor 331 in the standard configuration. Any suitable connecting means, such as a regular clutch, may be used to selectively engage or disengage the electric motor 331 from the main pump 302. The electric motor 331 may act as a generator in the standard configuration and as a motor to drive the main pump 302 in the windmilling configuration.

The controller 110 may be configured to determine that the gas turbine engine 200 is powered off; and cause the electric motor 331 to drive the main pump 302 upon the aircraft engine being powered off. The controller 110 may be configured to intermittently cause the electric motor 331 to drive the main pump 302. This may be done by powering the electric motor 331 for time during for every given number of minutes for instance. The same electric motor may be used to intermittently prevent rotation of the core of the gas turbine engine 200. The electric motor 331 may thus be used as a brake. A heater 332 may be located downstream of the main pump 302 and upstream of the components. The heater 332 may be powered only in the windmilling configuration. The heater 332 may be used to heat the lubricant before it reaches the components. The heater adds heat to the lubricant to increase its flowability (i.e., reduce the lubricant viscosity) through the components. This may decrease a power required to drive the main pump 302 and scavenge pump 303.

In this embodiment, lubricant is flow though all of the components, even if they are not rotating. However, valves such as described above may be used to prevent the lubricant from reaching the second components C2 that are non-rotating. This configuration is thus devoid of additional pump contrary to the configurations described in FIGS. 3A to 4B.

Figure 5B:
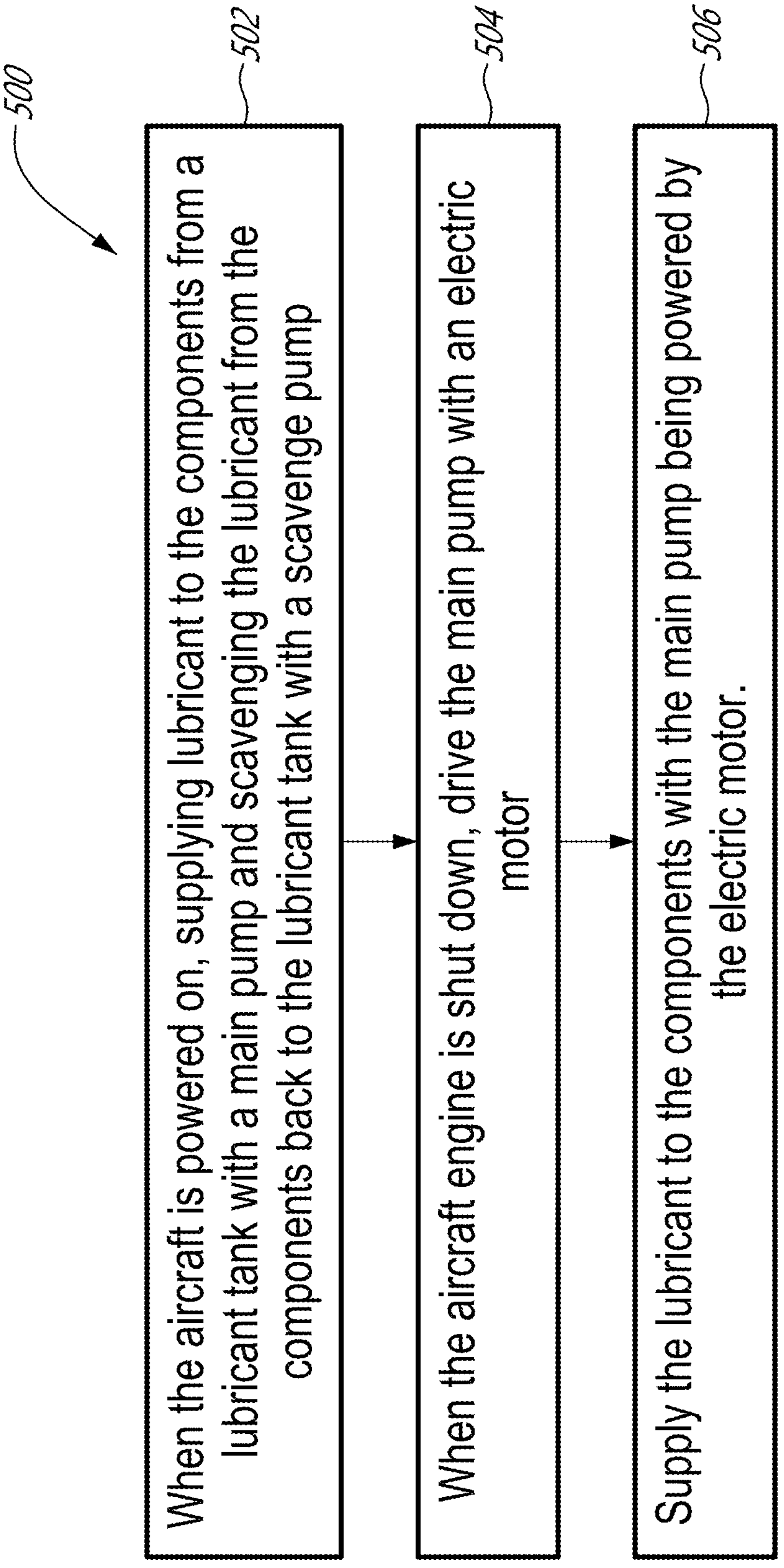
FIG. 5B is a flowchart illustrating steps of a method of lubricating components susceptible to windmilling-induced rotation.

Referring now to FIG. 5B, a method of lubricating a subset of components of an aircraft engine being prone to windmilling-induced rotation is shown at 500.

The method 500 includes when the aircraft is powered on, supplying lubricant to the components from the lubricant tank 301 with the main pump 302 and scavenging the lubricant from the components back to the lubricant tank with the scavenge pump 303 at 502; and when the aircraft engine is shut down: driving the main pump 302 with the electric motor 331 at 504; and supplying the lubricant to the components with the main pump 302 being powered by the electric motor 331.

The method 500 may include determining that the aircraft engine is powered off; and driving the main pump 302 with the electric motor 331 upon the aircraft engine being powered off. The driving of the main pump 302 with the electric motor 331 may includes intermittently driving the main pump with the electric motor as previously discussed.

In some embodiments, the driving of the main pump 302 with the electric motor 331 includes: receive operating parameters of the aircraft engine; determine a required rotational speed of the main pump 302 based on the operating parameters; and driving the main pump at the required rotational speed with the electric motor 331. This speed is determined to ensure that an adequate flow of the lubricant is provided to ensure proper lubrication. In some embodiments, a speed sensor may be used to generate a signal indicative of a rotational speed of the first components C1. This speed may be inputted in a lookup table to obtain an optimal rotational speed of the main pump 302 to generated the required rate of the lubricant.

The method 500 may include intermittently using the electric motor 331 to prevent rotation of the core of the aircraft engine when the main pump 302 is non-rotating. Hence, the electric motor 331 is used as a brake intermittently with being used to drive the main pump 302.

As shown in FIG. 5A, the driving of the main pump 302 with the electric motor 331 may include driving the main pump 302 with the electric motor 331 through the accessory gearbox 330 of the aircraft engine.

The method 500 may include powering the heater 332 for heating the lubricant before feeding the lubricant to the subset of the components.

Figure 6:
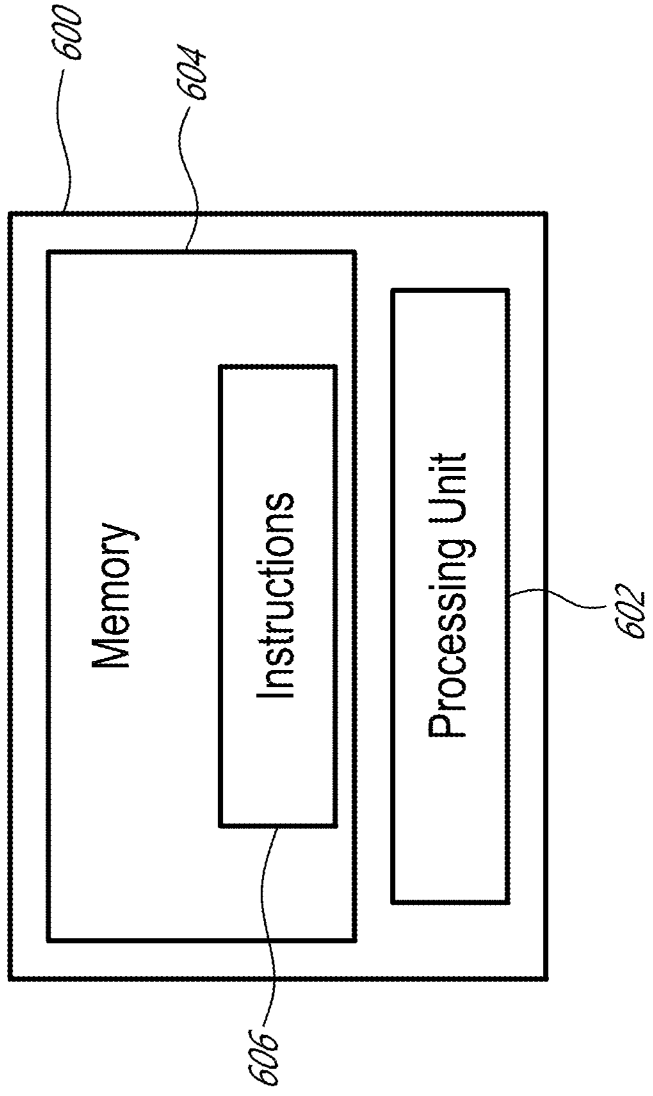
FIG. 6 is a schematic representation of a controller in accordance with one embodiment.

With reference to FIG. 6, an example of a computing device 600 is illustrated. For simplicity only one computing device 600 is shown but the system may include more computing devices 600 operable to exchange data. The computing devices 600 may be the same or different types of devices. The controller 110 may be implemented with one or more computing devices 600. Note that the controller 110 can be implemented as part of a full-authority digital engine controls (FADEC) or other similar device, including electronic engine control (EEC), engine control unit (ECU), electronic propeller control, propeller control unit, and the like. In some embodiments, the controller 110 is implemented as a Flight Data Acquisition Storage and Transmission system, such as a FAST™ system. The controller 110 may be implemented in part in the FAST™ system and in part in the EEC. Other embodiments may also apply.

The computing device 600 comprises a processing unit 602 and a memory 604 which has stored therein computer-executable instructions 606. The processing unit 602 may comprise any suitable devices configured to implement the method described herein such that instructions 606, when executed by the computing device 600 or other programmable apparatus, may cause the functions/acts/steps performed as part of the method as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems described herein may be implemented in a high level procedural or object oriented programming or scripting language, or a combination thereof, to communicate with or assist in the operation of a computer system, for example the computing device 600. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine for a multi-engine aircraft, comprising:

a low-pressure assembly including a low-pressure turbine drivingly engaged to a rotatable load, the low-pressure assembly having first components engaged by, and configured to assist rotation of, the low-pressure turbine and the rotatable load, the first components being susceptible to rotation by windmilling and having first inlets and first scavenge outlets, one of the first components having a lubricant-receiving volume fluidly connected to scavenge outlets of a remainder of the first components;

a high-pressure spool rotating independently of the low-pressure assembly and including a high-pressure turbine drivingly engaging a compressor, the high-pressure spool having second components engaged by, and configured to assist rotation of, the high pressure turbine and the compressor, the second components having second inlets and second scavenge outlets;

a lubricant system operatively connected to the first components and the second components, the lubricant system having:

a lubricant tank containing a volume of lubricant;

a main pump and a scavenge pump operable to drive a flow of the lubricant from the lubricant tank to the first inlets and the second inlets and from the first scavenge outlets and the second scavenge outlets back to the lubricant tank;

a secondary pump having an inlet fluidly connectable to the lubricant-receiving volume and an outlet fluidly connectable to the first components;

valves selectively fluidly connecting or disconnecting the first inlets of the first components to the main pump and the first scavenge outlets to the scavenge pump;

the lubricant system having:

a standard configuration in which the valves are configured to define a standard flow path extending from the lubricant tank to the first inlets and the second inlets via the main pump while bypassing the secondary pump, and from the first scavenge outlets and the second scavenge outlets to the lubricant tank via the scavenge pump; and a windmilling configuration in which the valve are configured to define a windmilling flow path extending from the lubricant-receiving volume to the first inlets via the secondary pump while bypassing the main pump, and from the first scavenge outlets to the lubricant-receiving volume while bypassing the scavenge pump.

2. The aircraft engine of claim 1, wherein the lubricant system is devoid of a secondary scavenge pump between the first scavenge outlets and the secondary pump.

3. The aircraft engine of claim 1, wherein the secondary pump is located outside the first components.

4. The aircraft engine of claim 1, wherein the valves include:

a first three-way valve fluidly connecting the main pump to the first inlets while disconnecting the secondary pump from the first inlets in the standard configuration, and fluidly connecting the secondary pump to the first inlets while disconnecting the main pump from the first inlets in the windmilling configuration; and a second three-way valve fluidly connecting the first scavenge outlets to the scavenge pump while disconnecting the first scavenge outlets from the secondary pump in the standard configuration, and fluidly connecting the first scavenge outlets to the secondary pump while disconnecting the first scavenge outlets form the scavenge pump in the windmilling configuration.

5. The aircraft engine of claim 1, wherein the secondary pump is located inside a component of the first components.

6. The aircraft engine of claim 1, wherein the aircraft engine is a turboprop engine, the rotatable load being a propeller.

7. The aircraft engine of claim 6, wherein the lubricant-receiving volume is defined by a reduction gearbox interconnecting the propeller to the low-pressure turbine.

8. The aircraft engine of claim 1, comprising a controller operatively connected to the valves, the controller having a processing unit and a computer-readable medium having instructions stored thereon executable by the processing unit to:

determine that the aircraft engine is powered off and susceptible to windmilling while the multi-engine aircraft is flying; and cause the valves to close the standard flow path and open the windmilling flow path.

* * * * *